United States Patent [19]
Thurston

[11] 4,332,025
[45] May 25, 1982

[54] DISC CLAMPING DEVICE

[76] Inventor: Brian D. Thurston, 285 W. 39th Ave., Vancouver, British Columbia, Canada, V5Y 2P4

[21] Appl. No.: 218,304

[22] Filed: Dec. 19, 1980

Related U.S. Application Data

[63] Continuation of Ser. No. 10,782, Feb. 9, 1979, abandoned.

[51] Int. Cl.³ .............................................. G11B 23/00
[52] U.S. Cl. .................................................... 369/270
[58] Field of Search ................................ 369/270, 271

[56] References Cited

U.S. PATENT DOCUMENTS

| | | | |
|---|---|---|---|
| 2,113,401 | 4/1938 | Goldsmith | 369/270 |
| 2,293,219 | 8/1942 | Rieber | 369/270 |
| 4,040,634 | 8/1977 | Leedom | 369/271 |

FOREIGN PATENT DOCUMENTS

| | | | |
|---|---|---|---|
| 130292 | 7/1919 | United Kingdom | 369/270 |
| 167735 | 1/1921 | United Kingdom | 369/270 |
| 320471 | 10/1929 | United Kingdom | 369/271 |
| 419324 | 11/1934 | United Kingdom | 369/270 |

*Primary Examiner*—Charles E. Phillips
*Attorney, Agent, or Firm*—Fulwider, Patton, Rieber, Lee & Utecht

[57] ABSTRACT

A device to secure a record to the turntable of a record player. The device comprises a releasable attachment at its center to align with the central hole in a record and to attach to the turntable. Arms to apply pressure to the record extend outwardly from said attachment to hold the record securely in contact with the turntable during playing.

3 Claims, 11 Drawing Figures

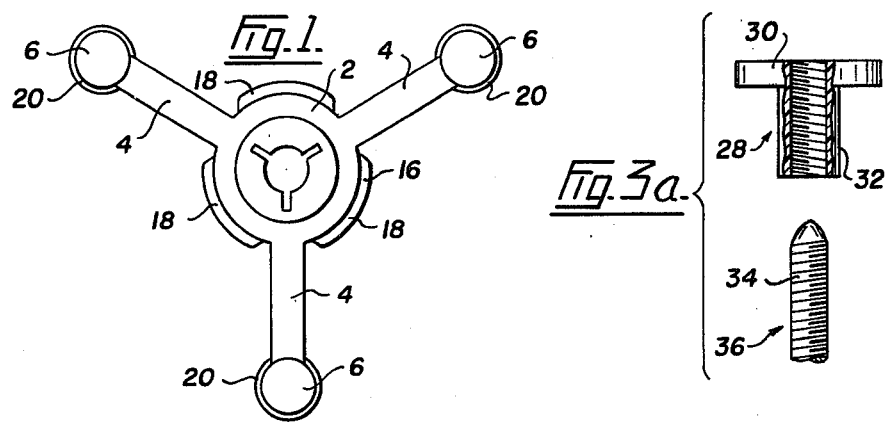
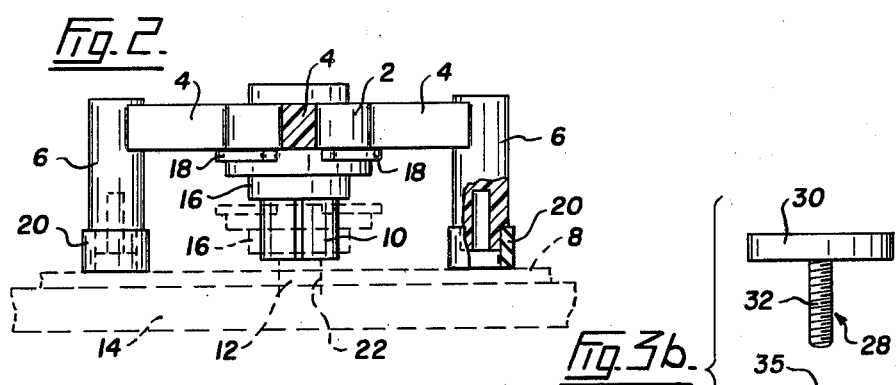
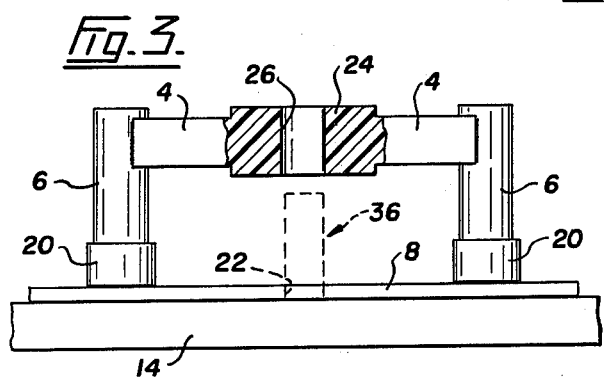
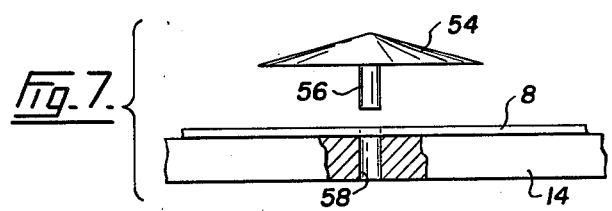
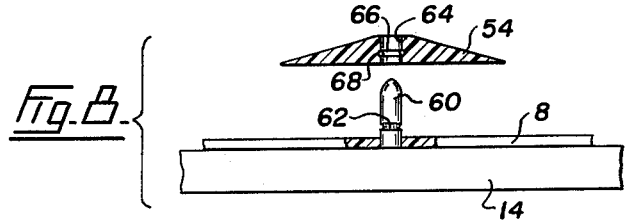

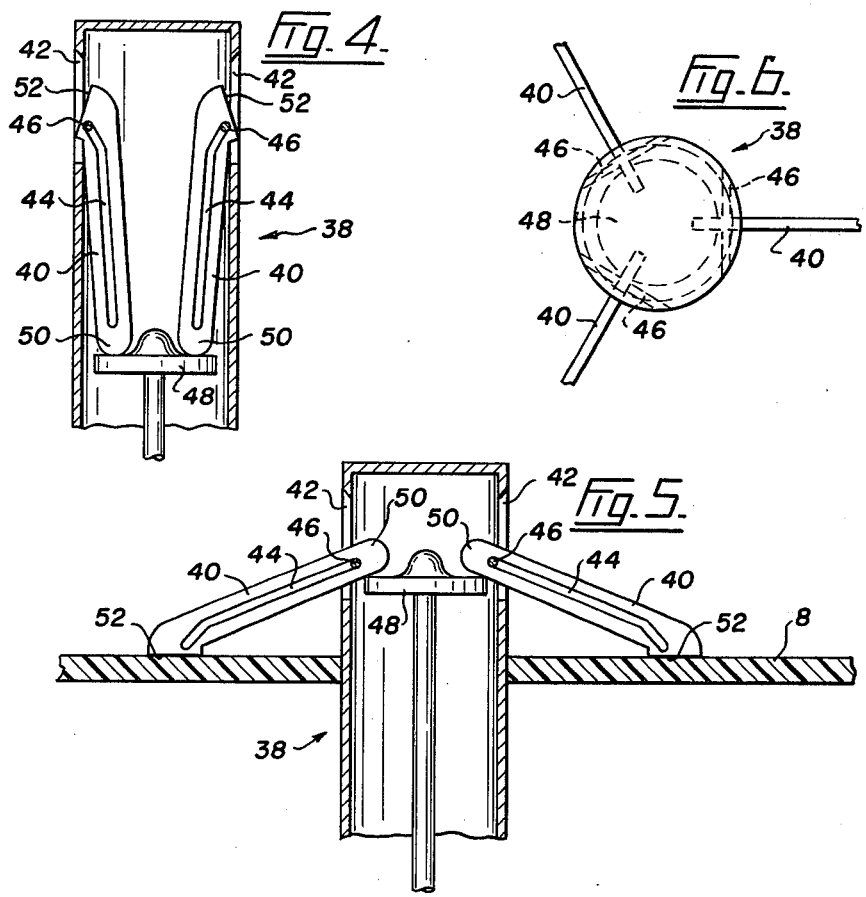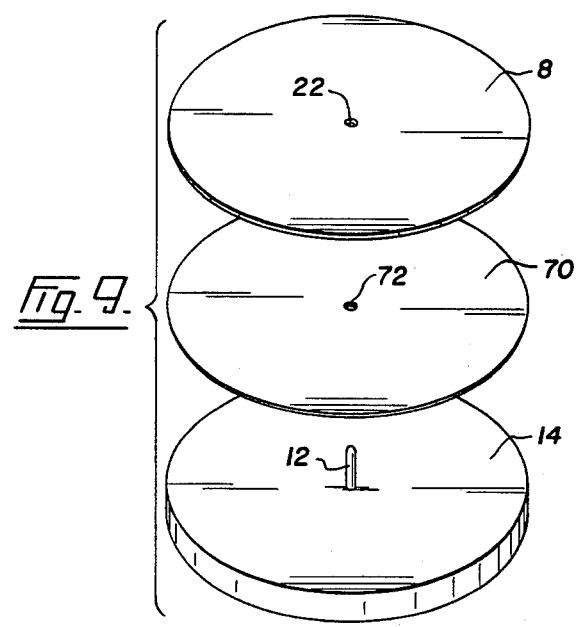

1

DISC CLAMPING DEVICE

This is a continuation of application Ser. No. 10,782, filed Feb. 9, 1979, now abandoned.

FIELD OF THE INVENTION

This invention relates to a device to secure a record to a turntable of a record player during playing.

It is essential, for ideal reproduction, that a record being played on the turntable of a record player does not turn independently of the turntable, for example by slipping. This is particularly important with modern high quality equipment which, because of the high quality of reproduction, makes such slipping apparent. The present invention provides a device that clamps a record to the turntable but is light in weight, can be easily attached to the turntable and easily removed.

SUMMARY OF THE INVENTION

Accordingly, in a first aspect the present invention is a device to secure a record having a central hole, a central area surrounding the hole and a grooved play area to a turntable of a record player, the device comprising releasable attachment means at its center to align with the central hole in a record and to attach to the turntable; pressure application means extending outwardly from said attachment means to apply pressure to said central area to hold the record securely in contact with the turntable during playing.

It is preferred, as most turntables have upstanding central spindles, that the releasable attachment means comprises a clamp to grip temporarily the exterior of the spindle.

In one embodiment the device comprises a central boss, arms extending outwardly from the boss; a leg at the end of each arm extending downwardly when the device is in its useful position to contact the central area of the record; a split tube extending downwardly from the boss when the device in its useful position to fit over an upstanding spindle on the turntable and a collar on the exterior of the split tube to compress the split tube onto the spindle when the collar is moved down the tube, away from the boss.

In a further embodiment the device comprises a central boss having a central opening aligned, when the device is in its useful position, with the central hole of the record; arms extending outwardly from the boss; a leg at the end of each arm extending downwardly when the device is in its useful position to contact the central area of the record; a threaded member comprising a head portion to contact the upper surface of the central boss, and a threaded stem, the threaded stem being dimensioned to fit through the central opening in the boss to engage a thread on a turntable spindle to clamp a record down during playing.

The stem may have an internal thread, in which case the spindle has a corresponding external thread, or the stem may have an external thread and the spindle a corresponding internal thread.

In all the above embodiments a preferred arrangement has been found to be three equidistant arms and legs with flexible feet at the end of each leg to contact the central area of the record.

Another embodiment of the invention comprises a circular body having a radius about the same as or less than the central area of the record; a spindle extending downwardly to frictionally engage a central hole in the record and a central hole in the turntable to clamp a record to the turntable during playing.

In a further embodiment there is a circular body with a radius about the same as or less than the central area of the record, a central opening to fit over an upstanding spindle on a turntable; a circumferential groove in the spindle; a corresponding groove in the interior of the central opening and associated engagement means to engage both grooves to secure said circular body in place on a spindle. The engagement means may be a resilient circlip.

In an aspect of the invention adapted to be a permanent part of the record player the device comprises a hollow turntable spindle with limbs housed within said spindle at a rest position; openings in said spindle, one for each limb; a closed slot in each limb; a pin for each limb, each pin extending through a slot in a limb, within the spindle, each pin adjacent an opening; reciprocable means in the spindle to abut the inner ends of each limb whereby movement upwards of the reciprocating means forces the lower ends of the limbs, guided by the pins engaging the slots, upwardly and the upper ends downwardly to contact the central area.

In a further aspect of the invention there is provided a record locating device to be positioned between a record and a turntable of a record player; a central hole to align with the central hole in the record and the turntable spindle; a first side of the device shaped to conform to the surface of the turntable; a second side of the device shaped to conform to a surface of a record and an adhesive layer on each side of the device to adhere temporarily the device to the turntable and the record to secure the record to the turntable during playing.

It is desirable that there be a protective cover for the adhesive when the device is not in use. The device can be left installed on the turntable, in which case the protective cover may be placed on top of the device to protect the upper adhesive until it is required to reposition a record on it.

BRIEF DESCRIPTION OF THE DRAWINGS

Aspects of the invention are illustrated, merely by way of example, in the accompanying drawings in which:

FIG. 1 is a plan view of an embodiment of the present invention;

FIG. 2 is a side elevation of the embodiment of FIG. 1;

FIG. 3 is the main body of a further embodiment of the invention;

FIGS. 3a and 3b illustrate means of locating the body of FIG. 3 on a record;

FIGS. 4 to 6 illustrates an embodiment of the invention;

FIG. 7 illustrates an embodiment;

FIG. 8 illustrates an embodiment; and

FIG. 9 illustrates an embodiment of the invention.

DESCRIPTION OF THE PREFERRED EMBODIMENTS

Referring to the drawings, the embodiment of the invention shown in FIGS. 1 and 2 comprises a central boss 2 with arms 4 extending outwardly from the boss 2. There is a leg 6 at the end of each arm 4 extending downwardly when the device is in its useful position on a record 8, particularly as indicated in FIG. 2. There is a split tube 10 extending downwardly from the boss 22.

Tube 10 fits over an upstanding spindle 12 on a turntable 14 to clamp the record 8 in position on the turntable 14. A collar 16 on the exterior of the split tube 10 compresses the split tube onto the spindle 12 when the collar 16 is moved down the tube 10 away from the boss 2. Collar 16 is shown in FIG. 2 in solid lines in the rest position—that is with the tube 10 open—and in broken lines in the locking position, that is with the tube 10 closed to grip the spindle 12. The split tube 10 tends, when unrestricted by the collar 16, to open outwardly downwardly, that is when the collar is in the solid line position shown in FIG. 2. There are projections 18 on the collar 16 to facilitate gripping with the fingers.

Flexible feet 20 are positioned at the end of each leg 6 to contact the central area of the record.

To use the embodiment of FIGS. 1 and 2 the record 8 is placed on the turntable 14 and the device of FIGS. 1 and 2 is then placed over the spindle 12, projecting through central hole 22 of the record 8. The collar 16 is in the retracted position shown in solid lines in FIG. 2. Once the device is in position the collar 16 is moved downwardly towards the broken line position shown in FIG. 2 until the split tube 10 grips the spindle 12 to clamp the record 8 firmly to the turntable 14.

In FIG. 3, similar numbers are used for parts already shown in FIGS. 1 and 2. The embodiment of FIG. 3 has a central boss 24 with a central opening 26 aligned, when the device is in the useful position as shown, for example, in FIG. 3, with the central hole 22 of the record 8. As in the embodiments of FIGS. 1 and 2, arms 4 extend outwardly from the boss 24 and there is a leg 6 at the end of each arm 4 extending downwardly to contact the central area of the record 8. FIGS. 3a and 3b illustrate threaded members 28 each comprising a head portion 30 to contact the upper surface of the central boss 24 and a threaded stem 32. The threaded stem 32 is dimensioned so that it fits through the central opening 26 in the boss 24 to engage a thread 34 on a turntable spindle 36 to clamp the record 8 during playing. In FIG. 3a the stem 32 has an internal thread and the spindle 36 has a corresponding external thread 34. In FIG. 3b the stem 32 has an external thread and the spindle has a corresponding internal thread 35.

The embodiments of FIG. 3 are used in a manner similar to the embodiment of FIGS. 1 and 2. The device is positioned on the record 8 with the feet 20 in contact with the central area. The central opening 26 in the central boss 24 is aligned with the spindle 36. The threaded member 28 is then positioned through the central opening 26 and is threaded onto the spindle 36 to secure the device in position and, of course, to clamp the record 8 in position while playing. After that the record player can be used in conventional manner.

The embodiments of FIGS. 1 to 3 may be made of polycarbonate.

The embodiment of FIGS. 4 to 6 involves a substantial modification of the existing turntable spindle. FIGS. 4 to 6 illustrate a hollow turntable spindle 38 with limbs 40 housed within the spindle 38 at the rest position as shown in FIG. 4. There are openings 42 in the spindle 38, one for each limb 40, and there is a closed slot 44 in each limb 40, that is the slot 44 stops short of each end of the limb 40 in which it is formed. There is a pin 46 for each limb 40 extending, as shown in FIG. 6, through the slot 44 in a limb 40. Each pin 46 is within the spindle 38 and adjacent an opening 42. There are reciprocable means in the form of a pusher 48 to abut the inner ends 50 of each limb 40. As is clear from a comparison of FIGS. 4 and 5 as the pusher 48 is moved upwardly the inner ends 50 of the limbs 40, guided by the pins 46 engaging in the slots 44, move upwardly and upper ends 52 are moved downwardly to the position shown in FIG. 5 to contact the central area of the record 8. The device is moved back to its rest position, that is from the position shown in FIG. 5 to the position shown in FIG. 4, simply by lifting up the record 8. The inner ends 50 of the limbs 40 push downwardly on the pusher 48 to move it back to the rest position shown in FIG. 4.

The pusher 48 may be moved upwardly by hand or a simple mechanical linkage (not shown) can be provided at the side of the record player to move the pusher 48 upwardly.

FIG. 7 illustrates an embodiment of the invention comprising a circular body 54 having a radius about the same as or slightly less than the central area of the record 8. There is a spindle 56 extending downwardly to engage frictionally the central hole in the record 8 and a central hole 58 in the turntable 14 to clamp the record 8 to the turntable 14 during playing.

The embodiment of FIG. 8 is similar. However, there is an upstanding spindle 60 on the turntable formed with a circumferential groove 62. There is a central opening 64 in the body 54 to fit over the upstanding spindle 60.

There is an internal groove 66 formed in the central opening 64 and a circlip 68 is located in the groove 66 in the central opening 64. The circlip 68 engages the circumferential groove 62 in the spindle 60 to lock the body 54 in place on a record 8. It will be appreciated that means other than the circlip 68 can be used and, of course, the circlip 68 can also be positioned so that it normally remains within the groove 62 in the upstanding spindle 60.

FIG. 9 illustrates a record locating device that is simple to produce but extremely effective in locating a record 8. The locating device comprises a disc 70 to be positioned between the record 8 and the turntable 14 of a record player. The turntable has a spindle 12. There is a central hole 72 in the disc 70 to align with the central hole 22 in the record 8 and with the turntable spindle 12. A first side of the device, the lower side in FIG. 9, conforms with the pattern on the surface of the turntable 14. The upper surface of the device is shaped to conform to the surface of the record 8. There is an adhesive layer on each side of the device to adhere temporarily to the turntable 14 and record 8 to secure the record 8 to the turntable 14. It is desirable to provide a protective cover for the adhesive when the device is not in use. In particular for marketing the device a protective cover should be provided for each side but once the device is installed on a turntable it may be left there. In that case only the upper protective cover is installed when a record is not being played.

Thus the present invention provides a number of devices to secure a record having a central hole, a central area surrounding the hole and a groove play area to a turntable and record player. A releasable attachment means at the center of the device aligns with a central hole in the record and attaches to the turntable, usually to the spindle. Pressure application means extends outwardly from the gripper means to apply pressure to the central area to hold the record securely in contact with the turntable during playing.

The device of the present invention greatly facilitates the playing of records, particularly on high quality record players. The device helps to center a record with a worn spindle hole. Once the record is properly centered the device according to the present invention will hold it in place, regardless of the worn spindle hole. The device is also of value in reducing warping of a record at least during playing so as to render it playable on most turntables. A particular advantage is that the device prevents record slippage on the turntable. The positive clamping of the record on the turntable by a device according to the present invention suppresses vibrations originating both from the stylus and from sound waves from the speaker of the record player. The effects of rumble on the produced sound are reduced by the small increase in mass of the record and by clamping the record to the turntable. However the design is of such a low weight that its weight does not effect the turntable balance or the suspension in any way that is harmful.

The rubber feet contact the central area of the record, usually the area where the record label is positioned. Thus, the device does not harm the record or the label. Furthermore, the rubber feet assist in absorbing vibrations.

Concerning the embodiment of FIG. 9 an appropriate adhesive must be non-migratory, in particular the composition must not migrate into the polyvinyl chloride from which records are normally made. Furthermore, the adhesive must be firmly adhered to the disc so that it does not leave the disc to adhere to the turntable or to the records. The material should be pliant so that it fills in the individual record grooves at the side opposite to the side being played. As indicated above the disc is generally shaped to conform to the shape of a record but if the material is pliant the conformation can be particularly good. It should also be able to dissipate static charges on the record surface, it should not be adversely affected by record cleaning chemicals and must be chemically stable.

The embodiment of FIG. 9 also offers the advantage of positive coupling of the disc to the turntable, the reduction of resonance, automatic removal of dust and dirt from the lower base of the record, the flattening out, at least during playing, of slight warps and avoids all possibility of record slippage.

I claim:

1. A device to secure a record having a central hole, a central area surrounding the hole and a grooved play area, to a turntable of a record player, the turntable having attached to it a smooth spindle, free of identations, and extending upwardly from said turntable to be able to engage the hole in the record and to extend through said hole, the device comprising:
   a central boss;
   arms extending outwardly from the boss;
   a leg at the end of each arm extending downwardly when the device is in its useful position to apply pressure to the central area of the record, remoted from the spindle, adjacent the perimeter of the central area to hold the record securely in contact with the turntable during play;
   a split tube extending downwardly from the boss when the device is in its useful position to fit over an upstanding spindle on the turntable; and
   a collar on the exterior of the split tube to compress the split tube onto the spindle when the collar is moved down the tube, away from the boss, at any height on the spindle, depending on the thickness of the record.

2. A device as claimed in claim 1 in which the split tube tends, when unrestricted by the collar, to open outwardly downwardly.

3. A device as claimed in claim 1 in which there are three equidistant arms and legs and flexible feet at the end of each leg to contact the central area of the record.

* * * * *